(12) United States Patent
Boivin et al.

(10) Patent No.: US 10,780,664 B2
(45) Date of Patent: Sep. 22, 2020

(54) SCREW PRESS WITH FILTER PLATES

(71) Applicant: Rio Tinto Alcan International Limited, Montreal (CA)

(72) Inventors: Alain Boivin, La Baie (CA); Marie-Louise Bouchard, Chicoutimi (CA); Guy Simard, La Malbaie (CA); Veronique Savard, Chicoutimi (CA); Simon Gravel, Jonquiere (CA)

(73) Assignee: Rio Tinto Alcan International Limited, Montreal (CA)

( * ) Notice: Subject to any disclaimer, the term of this patent is extended or adjusted under 35 U.S.C. 154(b) by 648 days.

(21) Appl. No.: 15/305,482

(22) PCT Filed: Apr. 9, 2015

(86) PCT No.: PCT/IB2015/000468
§ 371 (c)(1),
(2) Date: Oct. 20, 2016

(87) PCT Pub. No.: WO2015/162472
PCT Pub. Date: Oct. 29, 2015

(65) Prior Publication Data
US 2017/0043548 A1   Feb. 16, 2017

(30) Foreign Application Priority Data
Apr. 22, 2014  (EP) ..................... 14001431

(51) Int. Cl.
*B30B 9/12* (2006.01)
*B01D 29/46* (2006.01)
(Continued)

(52) U.S. Cl.
CPC ............ *B30B 9/127* (2013.01); *B01D 29/111* (2013.01); *B01D 29/35* (2013.01); *B01D 29/46* (2013.01);
(Continued)

(58) Field of Classification Search
CPC ....... C02F 11/12; C02F 11/121; C02F 11/125; C02F 11/122; B30B 9/02; B30B 9/12;
(Continued)

(56) References Cited

U.S. PATENT DOCUMENTS 4,270,875 A  *  6/1981  Kainuma .................. B30B 9/02
                                               405/129.15
5,380,436 A  *  1/1995  Sasaki ...................... B30B 9/26
                                               210/383
(Continued)

FOREIGN PATENT DOCUMENTS

CN         101584948 A       11/2009
CN         202490487 U       10/2012
(Continued)

OTHER PUBLICATIONS

Original copy of GB 1,037,384 including figures is provided and referenced (Year: 1966).*

(Continued)

*Primary Examiner* — Shelley M Self
*Assistant Examiner* — Katie L. Parr
(74) *Attorney, Agent, or Firm* — Banner & Witcoff, Ltd.

(57) ABSTRACT

A screw press for separating liquid from a solid-liquid mixture includes a casing having inlet and outlet sections, and a filter section there between. The filter section includes an axially extending stack of coplanar filtration plates defining a core passage for receiving a screw configured to convey the solid-liquid mixture from the inlet section to the outlet section while compressing and dewatering the solid-liquid mixture by forcing at least part of the liquid content of the mixture to be expelled out of the casing through inter-plate gaps defined between each pair of adjacent filtration plates. The filtration plates are fixed relative to one another and clamped in direct intimate face-to-face contact (Continued)

by a clamping assembly operable for applying a predetermined axially clamping pressure substantially uniformly about the core passage. The inter-plate gaps are controlled by the surface roughness of the plates and the clamping pressure.

23 Claims, 5 Drawing Sheets

(51) Int. Cl.
*B30B 9/26* (2006.01)
*B01D 29/35* (2006.01)
*B01D 29/64* (2006.01)
*B01D 29/11* (2006.01)
*C02F 11/125* (2019.01)

(52) U.S. Cl.
CPC ............ *B01D 29/6476* (2013.01); *B30B 9/12* (2013.01); *B30B 9/26* (2013.01); *C02F 11/125* (2013.01)

(58) Field of Classification Search
CPC ............ B30B 9/127; B30B 9/26; B30B 9/262; B30B 9/267; B30B 9/301; B30B 9/3039; B01D 25/12; B01D 25/16; B01D 29/13; B01D 29/23; B01D 29/25; B01D 29/31; B01D 29/35; B01D 29/356; B01D 29/44; B01D 29/46; B01D 29/90; B01D 35/29; B01D 25/19

USPC .......... 100/37, 104, 110, 117, 128, 129, 145
See application file for complete search history.

(56) References Cited

U.S. PATENT DOCUMENTS

| | | | |
|---|---|---|---|
| 6,258,262 B1* | 7/2001 | Katabe | B01D 29/23 210/174 |
| 2004/0168986 A1* | 9/2004 | Katano | B01D 25/26 210/695 |
| 2011/0297016 A1* | 12/2011 | Yamashita | B01D 29/35 100/145 |
| 2013/0062268 A1* | 3/2013 | Kaneko | B01D 29/35 210/228 |

FOREIGN PATENT DOCUMENTS

| | | | | |
|---|---|---|---|---|
| CN | 103920323 A | | 7/2014 | |
| GB | 1037384 A | | 7/1966 | |
| JP | 3159378 | | 5/2010 | |
| JP | 3159378 U | * | 5/2010 | |
| WO | WO-2013149350 A1 | * | 10/2013 | ........... B01D 33/009 |

OTHER PUBLICATIONS

International Search Report—App No. PCT/IB2015/000468—dated Jul. 10, 2015.
Oct. 25, 2016—(WO) International Prelimnary Repor on Patentability—App PCT/IB2015/00468.

* cited by examiner

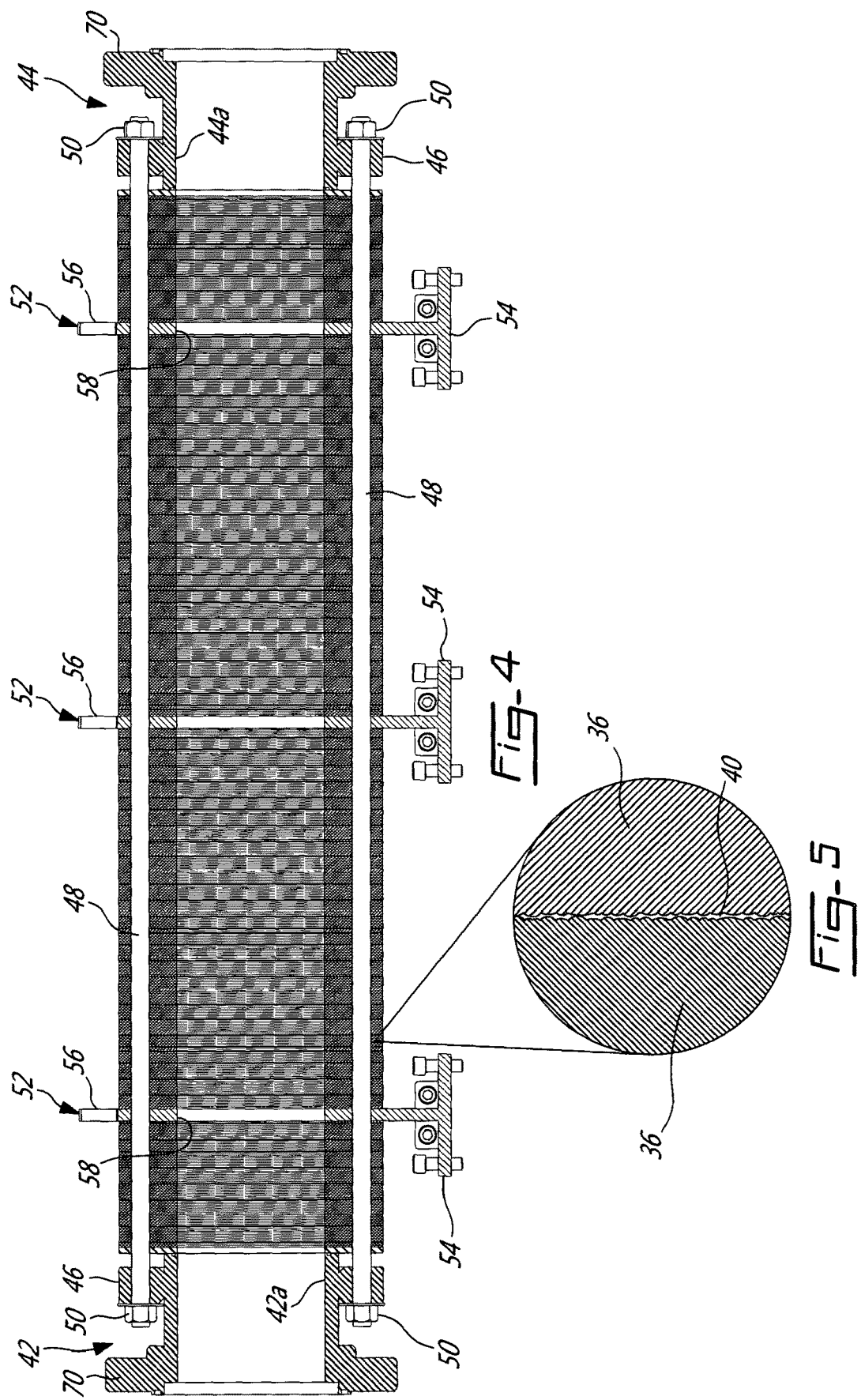

SCREW PRESS WITH FILTER PLATES

CROSS-REFERENCE TO RELATED APPLICATIONS

This application is a U.S. National Stage application under 35 U.S.C. § 371 of International Application PCT/IB2015/000468 (published as WO 2015/162472 A1), filed Apr. 9, 2015, which claims priority to European Patent Application No. EP 14001431.7, filed Apr. 22, 2014, and the present application claims priority to and the benefit of both of these prior applications, each of which is incorporated by reference in its entirety.

TECHNICAL FIELD

The present invention relates generally to solid-liquid separation equipment and, more particularly, to a screw press for dewatering slurry, such as red mud generated in the production of alumina from Bauxite ore. The present invention also relates to a process for separating liquid from a slurry, such as red mud generated in the production of alumina from Bauxite ore, by using a screw press.

BACKGROUND OF THE ART

Safe treatment and storage of high volume industrial waste streams, such as Bauxite residue (red mud) from aluminum production, pose several waste management challenges. Land disposal of these materials often has negative environmental impacts such as contamination of soil and groundwater, and consumes vast areas of land, and, thus, result in substantial costs for the alumina producing industry. Since the production of red mud in the Bayer process is inevitable, the industry has focused on minimizing the volume of red mud to be disposed by extracting as much as possible liquid from the mud.

Current processes particularly rely on decantation in large gravity settlers. However, such mud compacting processes require several hours to obtain a solid concentration of not more than about 45 and 50%.

Other known slurry filtration apparatuses are not well adapted for red mud filtration applications and the like.

For example, the British patent No. 1,037,384 describes a filtration apparatus that comprises a plurality of discs superimposed one upon another, the arrangement being such that fluid can percolate between the faces of discs, a passageway passing through the assembly of discs transversely with respect to planes thereof, an intermittently opening inlet at one part of said passageway for fluid to be filtered, a discharge for separated-out solids and/or semi-solids at another part of said passageway and means for feeding agglomerated solids and/or semi-solids to said discharge, the latter being arranged so that the solids and/or semi-solids are compressed and discharged in compressed form.

In the above-mentioned filtration apparatus, the filter discs are maintained in a state of predetermined (but adjustable during operation) compression by a spring, in order to maintain a constant flow of filtrate. The spring-loading of the filter discs allows the forcing of the discs apart during the passage of some solids. The operation of the above-mentioned filtration apparatus therefore relies on the intermittently opening inlet for reversing the direction of the flow, by closing the inlet for clearing said solids, before resuming filtration by opening of the inlet again. This intermittent opening inlet and the resulting movements of the filter discs make the above-mentioned filtration apparatus more complex and more liable to blockage. Small particles, such as the one contained in red mud slurry, could remain stuck between filter discs, thereby creating preferential passages between filter discs.

The above-mentioned filtration apparatus would not allow to reach an acceptable level of performance, for instance with respect of the solid concentration of the compacted slurry, and would not be adapted for a viable industrial filtration of red mud and the like, requiring the treatment of large quantity of slurry of solid in an acceptable time. In addition, the adjustable spring compression system would not be functional with the high pressures required for filtering slurries, such as red mud slurry.

Accordingly, there is a need to provide new solid-liquid separation equipment which addresses the above mentioned issues.

SUMMARY

It is therefore an object to increase the solid fraction of compacted slurry, and to provide a reliable industrial filtration apparatus that can treat large quantity of slurry.

It is another object to provide an industrial filtration apparatus that can treat slurry having very fine particles, that is to say slurry having particles of less than 40 microns. More particularly, the industrial filtration apparatus can treat slurry having at least 10%, preferably at least 40%, more preferably at least 60%, and up to 100%, of particles of less than 40 microns, such as red mud slurry.

It is another object to provide an industrial filtration apparatus that can treat large quantity slurry at high pressure.

In accordance with a general aspect of the present invention, there is provided a screw press for separating liquid from a solid-liquid mixture, the screw press comprising: a generally tubular body with axially spaced-apart inlet section and outlet section, and a filter section between said inlet section and outlet section; said filter section including an axially extending stack of coplanar filtration plates defining a core passage; and a rotatable screw mounted in said tubular body and extending axially through said core passage for conveying the solid-liquid mixture from the inlet section to the outlet section while compressing and dewatering the solid-liquid mixture by forcing at least part of the liquid content of the mixture to be expelled out of the tubular body through liquid passages of said filter section surrounding the core passage, said liquid passages being formed by inter-plate gaps defined between each pair of adjacent filtration plates; characterized in that the filtration plates are continuously maintained fixed relative to one another and clamped in direct intimate face-to-face contact by a clamping assembly operable for applying a predetermined axially clamping pressure substantially uniformly about said core passage, and in that the filtration plates have a predetermined surface roughness (R), the inter-plate gaps being function of said predetermined surface roughness (R) and said axially clamping pressure.

In accordance with another general aspect of the present invention, there is provided a process for separating liquid from a solid-liquid mixture by using a screw press comprising a generally tubular body with axially spaced-apart inlet section and outlet section and a filter section, between said inlet section and outlet section, including an axially extending stack of coplanar filtration plates defining a core passage and inter-plate gaps between each pair of adjacent filtration plates, said process being characterized in that it comprises:
  providing filtration plates having a predetermined surface roughness;

applying a predetermined axially clamping pressure substantially uniformly the core passage using a clamping assembly for continuously maintaining the filtration plates fixed relative to one another and clamped in direct intimate face-to-face contact by a clamping assembly, the inter-plate gaps being function of said predetermined surface roughness and said axially clamping pressure;

introducing solid-liquid mixture through the inlet section;

conveying the solid-liquid mixture from the inlet section to the outlet section while compressing and dewatering the solid-liquid mixture with a rotatable screw mounted in said tubular body and extending axially through said core passage, by forcing at least part of the liquid content of the mixture to be expelled out of the tubular body through liquid passages of said filter section surrounding the core passage, said liquid passages being formed by the inter-plate gaps; and producing a dehydrated mixture at the outlet section.

The predetermined axial clamping pressure is preferably maintained constant.

Further details of these and other aspects of the present invention will be apparent from the detailed description and figures included below.

DESCRIPTION OF THE DRAWINGS

Reference is now made to the accompanying figures, in which:

FIG. 4 is a longitudinal cross-section view of the filter section shown in FIG. 3;

FIG. 5 is an enlarged view illustrating an inter-plate gap between two adjacent filtration plates of the filter section shown in FIGS. 3 and 4.

DETAILED DESCRIPTION OF THE PREFERRED EMBODIMENTS

Figure 1:
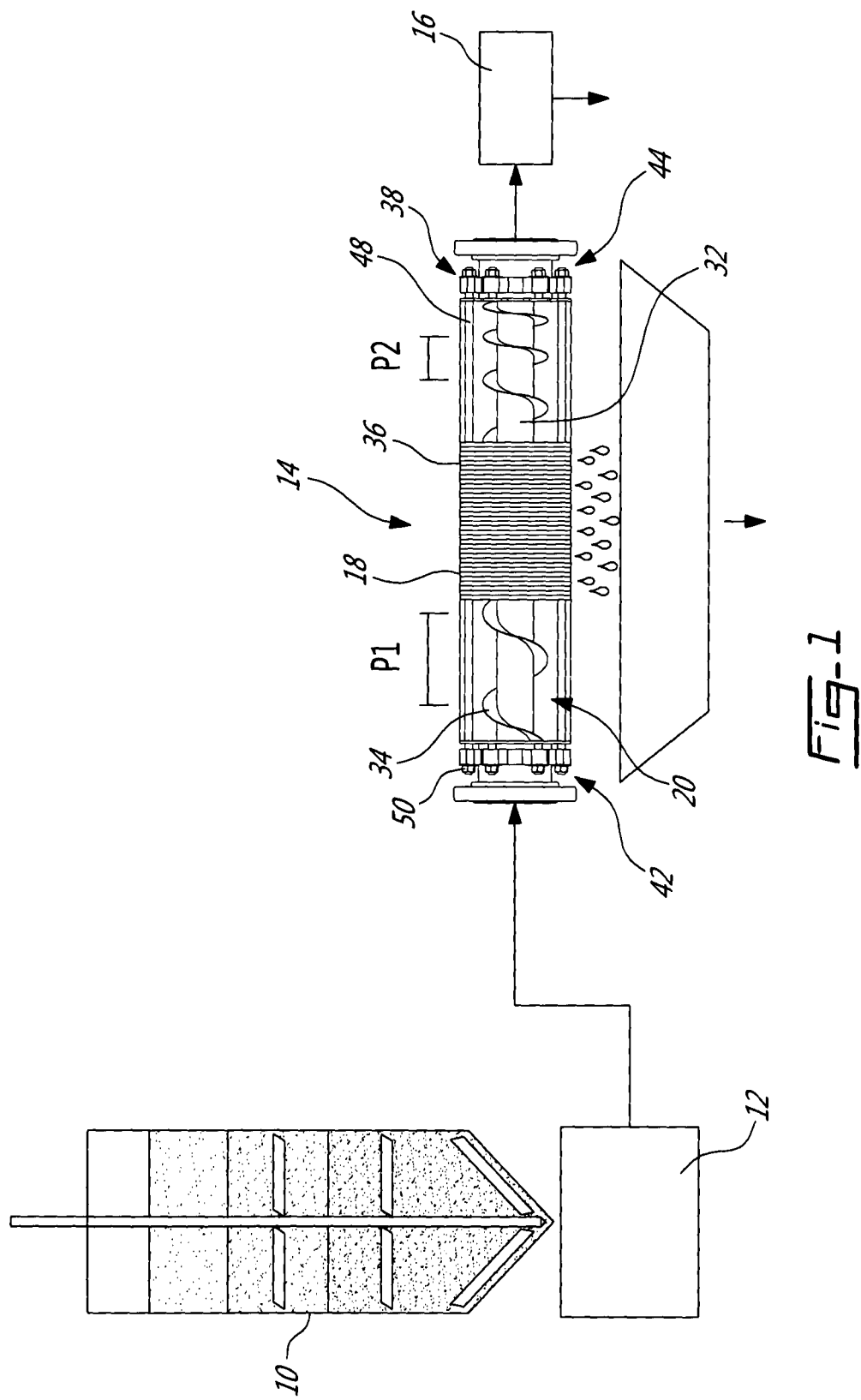
FIG. 1 is a schematic view of a pressure filtration installation in accordance with an embodiment of the present invention.

FIG. 1 is representative of an application to which the principles of the present invention may be applied. More particularly, FIG. 1 illustrates a pressure filtration installation for removing liquid from a solid-liquid mixture. According to one application, the pressure filtration installation is particularly well adapted for dewatering red mud (the residue of Bayer process in the production of alumina from Bauxite ore). However, it is understood that the pressure filtration installation could be configured and use for dehydrating various types of slurry and is, thus, not strictly limited to red mud dewatering applications.

As can be appreciated from FIG. 1, the installation generally comprises a reservoir 10 containing the red mud or slurry to be dehydrated, feeding means, such as a positive displacement pump 12, operatively connected to the reservoir 10 for feeding the slurry under pressure to a screw press 14, and a valve 16 for regulating the flow of dehydrated mud at a discharged end of the screw press 14.

The positive displacement pump is usually combined with means for allowing the delivery of a substantially constant flow rate of slurry at a substantially constant inlet pressure. The input flow rate of slurry can be controlled by the stroke speed of a positive displacement pump. The inlet pressure and flow rate can be maintained during cycle/piston changeover of the positive displacement pump, by a non-return valve (or a check valve) to prevent reverse flow, and by a pressurized dampener, such as a reservoir, to supply slurry during the changeover.

Figure 2:
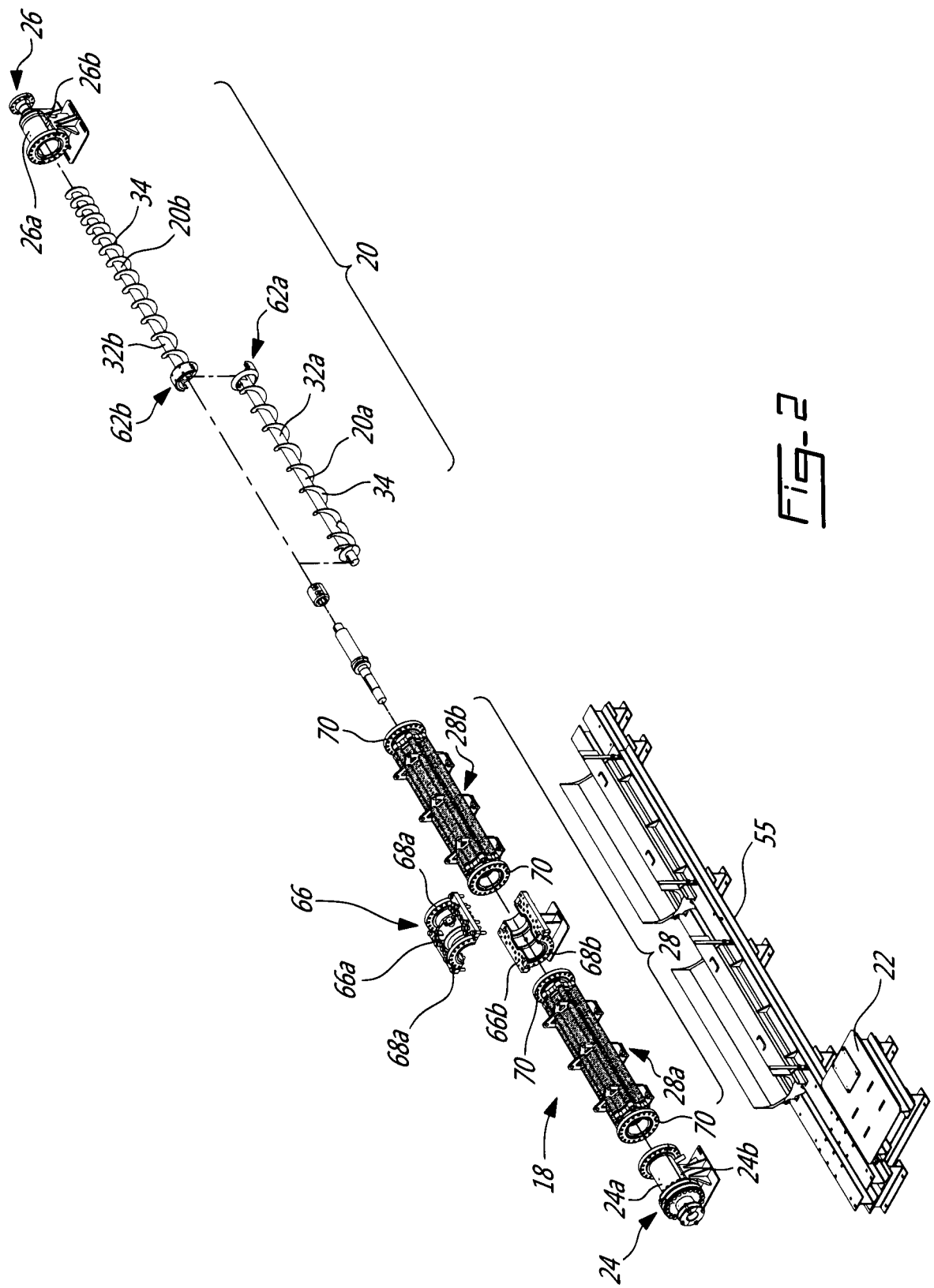
FIG. 2 is an exploded perspective view illustrating construction details of a screw press forming part of the pressure filtration installation shown in FIG. 1.

As shown in FIG. 2, the screw press 14 generally comprises a filter casing having a generally tubular body 18 for surrounding a screw 20 adapted to be rotatably mounted within the tubular body 18. A motor (not shown) is mounted on a platform 22 adjacent to the filter casing for driving the screw 20 via a suitable transmission arrangement, such as a belt transmission or a direct drive (not shown). In operation, the screw 20 applies a longitudinal pressure gradient on the solid-liquid mixture to be dewatered. The pressure of the fed slurry or the slurry supply pressure, for instance at the outlet of the displacement pump 12, causes the liquid to be squeezed out from the mixture and out of the screw press casing as schematically depicted in FIG. 1. In addition to the slurry supply pressure, the action of the screw 20 on the solid-liquid mixture also causes the liquid to be squeezed out from the mixture and out of the screw press casing. The (size of the) opening of the outlet valve can be continuously altered to simultaneously maintain the required pressure within the apparatus and to control the outlet flow rate of the dewatered slurry.

As best shown in FIG. 1, the screw 20 generally comprises a shaft 32 and a continuous flight 34 extending helically around a smooth outer surface of the shaft 32. The screw flight 34 has a constant outer flight diameter, which is slightly less than an inner diameter of the tubular body of the filter casing by a predetermined flight clearance. According to one embodiment of the present invention, the outer diameter of the shaft 32 is constant along all the length of the screw 20. Still according to this embodiment, the pitch (see P1 and P2 on FIG. 1) of the flight 34 gradually decreases towards the discharge end of the screw press (i.e. in a downstream direction). As a result, the volume between adjacent turns of the screw flight 34 decreases progressively towards the discharge end of the screw press 14, thereby gradually increasing the pressure on the solid-liquid mixture and promoting solid-liquid separation.

As shown in FIG. 2, the tubular body 18 of the filter casing has axially opposed inlet and outlet sections 24, 26, and a filter section 28 between the inlet and outlet sections 24, 26. As schematically illustrated in FIG. 1, the filter section 28 has fluid passages for allowing liquid to be evacuated out of the filter casing as the solid-liquid mixture is being conveyed from the inlet section 24 to the outlet section 26 by the screw 20. The inlet section 24 is operatively connectable in flow communication to the output side of the positive displacement pump 12 for receiving a continuous feed of the slurry at a predetermined pressure. The inlet section 24 is preferably designed for maintaining continuous fluid communication with the tubular body 18. Satisfactory results have been obtained by force-feeding the screw press 14 at a pressure preferably ranging from about 2 N/mm$^2$ (approximately 300 psi) to about 14 N/mm$^2$ (approximately 2000 psi), and more preferably between about 4-10 N/mm$^2$ (approximately 600-1500 psi). It is understood that the feeding pressure may change depending on the size of the screw press 14. The outlet section 26 may have a conical passage section operatively connectable to the valve 16 to regulate the flow of dehydrated sludge coming out from the screw press and to maintain the desired filtering pressure inside the filter casing.

The inlet and outlet sections 24, 26 each include upper and lower half-shell members 24a, 24b; 26a, 26b adapted to be bolted to one another to form a complete cylindrical casing section. Bushings or the like (not shown) may be provided in the inlet and outlet sections 24, 26 on the inner surfaces of the half-shell members 24a, 24b; 26a, 26b to rotatably support the axially opposed ends of the screw 20.

Figure 3:
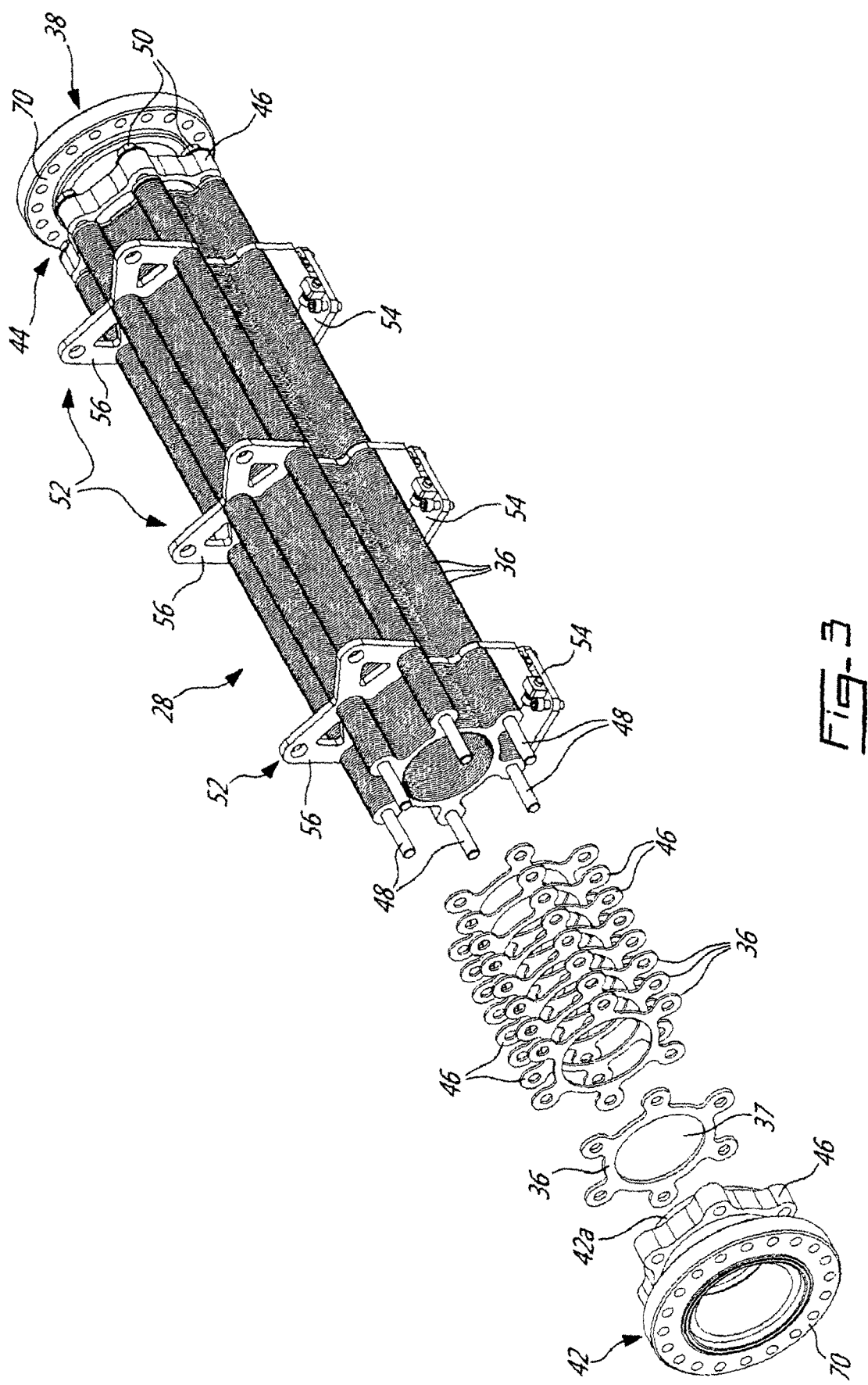
FIG. 3 is a partly exploded perspective view of one of the filter sections of the screw press.

Referring to FIGS. 3 and 4, it can be appreciated that the filter section 28 generally comprises a plurality of stationary filtration plates 36 axially clamped to be continuously maintained in intimate face-to-face contact by a clamping assembly 38 operable for applying a predetermined axially clamping pressure substantially uniformly about an inner diameter of the plates 36. The predetermined axial clamping pressure is preferably maintained constant. Each filtration plate 36 may be provided in the form of a flat disc defining a central hole 37. Once assembled, the central holes 37 of the plates 36 are axially aligned to jointly form an axially extending core passage for receiving the screw 20.

Since the filtration plates 36 are continuously maintained in intimate face-to-face contact, there is no risk that some of the discs be forced apart, which would create preferential passages and results in intermittent decrease of the slurry pressure inside the core passage below the pressure at the outlet of the displacement pump 12. Consequently, there is no risk that small particles, such as the one contained in red mud slurry, could remain stuck between filter discs. It is a significant advantage over the filtration apparatus of the prior art to be able to maintain the slurry pressure inside the screw press of the invention at a relatively constant value. The screw press of the present invention is consequently preferably operated in steady state most of the time.

As will be seen hereinafter, the clamping pressure and the surface roughness of the plates 36 are selected to provide for the formation of a predetermined "micro" inter-plate gap 40 (FIG. 5) between each pair of adjacent plates 36. The inter-plate gap 40 is selected to be sufficiently large to allow the liquid, which has been squeezed out by the screw 20, to percolate between the plates 36, while being sufficiently small to prevent the passage of the solid particles, thereby allowing for the formation of a cake of dehydrated mud on the inner diameter of the filter section 28. Once formed, the solid particle cake contribute to maintain the pressure inside the filter section 28 despite the presence of the inter-plate gaps 40 (i.e. it limits pressure escape through the inter-plate gaps 40). The thickness of the solid particle cake is maintained by the screw, which also acts to trim said cake. Depending on the solid-liquid mixture to be dehydrated, the inter-plate gaps 40 may range from about 1 to about 60, and preferably from about 2 microns to about 20 microns. For red mud dewatering applications, the inter-plate gap 40 is preferably from about 4 microns to about 6 microns and more preferably from about 5 microns to about 6 microns. It can be generally said that the inter-plate gaps 40 are selected to be smaller or in the same order of magnitude than a medium size value of the solid particles contained in the solid-liquid mixture to be processed and sufficiently large to allow liquid percolation.

As mentioned herein above and as schematically illustrated in FIG. 5, each inter-plate gap 40 is function of the surface roughness of the plates 36. The surface roughness (R) of the filtration plates 36 may be defined as the average peak height of the asperities at the surface of the filtration plates 36. When the plates are clamped together, the peaks extending from the opposing faces of the plates 36 prevent the plates from mating in perfect face-to-face sealing engagement, thereby resulting in the formation of micro-passages extending from the inner diameter of the plates 36 to the outer peripheral edge thereof. Depending on the solid-liquid mixture to be dehydrated, filtration plates having a surface roughness ranging from about 1 micron to about 30 microns could be used. Tests have shown that the optimum range of surface roughness for red mud filtration applications is between about 1.4 microns and about 3.5 microns. However, satisfactory results may also be obtained with surface roughness ranging from about 2 microns to about 10 microns.

By surface roughness of filtration plates, it is generally meant the surface roughness on the entire surface of both faces of each plate.

The liquid passages of the filter section 28 are formed by inter-plate gaps 40 defined between each pair of adjacent filtration plates 36. The liquid passages extend from the inner diameter of the plates 36 to the outer peripheral edge thereof. The liquid passages surround the core passage defined by the axially extending stack of coplanar filtration plates 36. The filtration plates 36 being maintained clamped continuously in direct intimate face-to-face contact, the resulting liquid passages, which extend from the inner diameter of the plates 36 to the outer peripheral edge thereof, are uniformly distributed around the core passage, thereby preventing the creation of preferential passages.

In other words, the filtration plates 36 are maintained clamped continuously in direct intimate face-to-face contact, on a surface that extends from the inner diameter of the plates 36 to the outer peripheral edge thereof, so that the resulting liquid passages are uniformly distributed around the core passage, thereby preventing the creation of preferential passages.

Tactile or optical roughness depth measuring equipment is used to ensure that the plates 36 have the desired surface roughness. Preferably, the plate surface roughness is measured using a contact-type instrument having a stylus adapted to be placed in direct contact with the surface of each of the filtration plates 36. As the stylus traces across a plate, it rises and falls together with the roughness on the plate surface. This movement in the stylus is picked up and used to measure surface roughness.

The filtration plates 36 may be made out of a wide variety of materials, including, for instance: stainless steel, black steel, steel with a baked paint finish, and ceramic. It has been observed that a baked paint finish allows improving the permeability of the filter section 28 while offering a good protection against abrasion and corrosion. The selected material must be able to sustain corrosive environments, stable at the operating temperatures (e.g. 100° C.), and strong enough not to collapse or be subject to compression/deformation over the entire range of clamping pressures applied by the clamping assembly 38. The plate material is also selected so that the fluid flow resistance through the inter-plate gaps 40 is inferior to the resistance of the solid particle cake formed on the inner diameter of the plates 36. In other words, the fluid flow resistance of the filtration plates 36 is selected so that it is less limitative than that of the solid particle cake. It is noted that different materials with different surface roughness may be used to obtain similar liquid flow resistances between the filtration plates 36. For instance, it has been found, while conducting red mud dewatering experimentations, that stainless steel plates with a 1.4 surface roughness and steel plates with a baked paint finish and a surface roughness of 3.5 offer similar liquid flow resistances.

The liquid flow resistance through the inter-plate gaps 40 is also function of the filtration height which corresponds to the distance along which the plates 36 are urged in intimate face-to-face contact between their inner diameter and their outer peripheral edge. The greater the filtration height, the greater the flow resistance through the plates will be. The filtration plates 36 being maintained clamped, at all time, or continuously, in direct intimate face-to-face contact, the resulting liquid passages extend over the whole filtration height, thereby preventing the creation of preferential passages.

The filtration plates 36 may be subject to various surface treatments to obtain the desired surface roughness and liquid flow resistance. For instance, the plates 36 may be subjected to a bead blasting surface treatment. Glass beads surface treatment is preferred over sand blasting surface treatment. Sand blasting is more abrasive and results in greater surface roughness values than those obtained with glass bead blasting.

Various coatings may be applied to the filtration plates 36 to protect them against corrosion, to change their hydrophobic or hydrophilic properties and/or to alter their surface roughness. For instance, a mixture of paint and particles could be applied over the plates 36 to protect them against corrosion and to obtain a desired surface roughness.

As mentioned herein before, the inter-plate gaps 40 are also function of the clamping pressure applied on the filtration plates 36. The clamping pressure must be applied as uniformly as possible about the core passage defined by the filtration plates 36 in order to avoid leakage. Referring to FIGS. 3 and 4, it can be appreciated that the clamping assembly 38 generally comprises first and second clamping plates 42, 44 respectively provided at opposed ends of the filter section 28 with the filtration plates 36 disposed therebetween. Each of the first and second clamping plates 42, 44 has a load distribution portion, which may take the form of a ring or cylindrical projection 42a, 44a extending from one face thereof, for entering in uniform bearing contact with an adjacent one of the filtration plates 36 concentrically about the central hole 37 thereof. Uniformly circumferentially distributed ear sections or eyelet projection 46 extend radially outwardly from the filtration plates 36 and the cylindrical projections 42a, 44a of the clamping plates 42, 44 for engagement with axially extending stay bolts 48. It is understood that the mounting holes defined by the eyelet projections could be otherwise provided. For instance, mounting holes could be defined directly in the filtering ring surface of the plates 36. At least four, preferably six, sets of eyelets and stay bolts are circumferentially distributed about the core passage defined by the filtration plates 36. Nuts 50 are threadably engaged at opposed distal ends of the stay bolts 48 to axially clamp the stack of filtration plates 36 between the clamping plates 42, 44. The nuts 50 are tighten at a same predetermined torque. A suitable tool, such as a torque wrench, is used to ensure that the exact same torque is applied at each nut 50. According to one application of the present invention, a calibrated tightening torque comprised between about 56 N-m (approximately 500 lbf-in) and about 560 N-m (approximately 5000 lbf-in) is applied on each of the nuts 50. The required torque increases with the size (length and diameter) of the screw press 14. For instance, for a screw having a diameter of about 0.1 m, the clamping torque could be about 56 N-m (approximately 500 lbf-in); whereas for a diameter of 0.3 m, the clamping torque could be in the vicinity of 225 N-m (approximately 2000 lbf-in). The thickness of the clamping plates 42, 44, including the cylindrical projections 42a, 44a and the eyelets 46 or ear sections, is selected to avoid any deformation under such tightening conditions. This is why the clamping plates 42, 44 are much thicker than the filtration plates 36. This allows to ensure uniform pressure distribution on the plates between adjacent nuts 50 and, thus, about the circumference of the central hole 37 of the filtration plates 36. It is understood that the value of the torque will vary depending on the size/geometry of the filtration plates 36. The torque is selected to generally correspond to a clamping pressure of between about 1.4 N/mm$^2$ (approximately 200 psi) and about 3.5 N/mm$^2$ (approximately 500 psi), and preferably between about 2 N/mm$^2$ (approximately 300 psi) and about 2.8 N/mm$^2$ (approximately 400 psi) on each of the filtration plates 36.

The clamping pressure applied on the filtration plates 36 is such that the filtration plates are maintained clamped, at all time, or continuously, in direct intimate face-to-face contact.

As shown in FIGS. 3 and 4, at least one intermediate support plate 52 (three in the illustrated example) is interposed between two adjacent filtration plates 36. The number of support plates 52 will vary depending on the axial length of the filter section 28. The supports plates 52 are inserted at predetermined intervals along the axial length of the filter section 28 to provide uniform support and prevent deformation of the stack of filtration plates 36 under the clamping forces applied thereon by the clamping plates 42, 44. The support plate 52 contributes to solidify the plate assembly while providing a bottom mounting interface or foot 54 for fastening the filter section 28 to an underlying frame structure 55 (FIG. 1). Also, the intermediate support plate 52 may be provided at an upper end thereof with a pair of ear projections 56 for facilitating handling and transportation of the assembled filter section 28. Mounting holes are also defined in the intermediate support plate for engagement on the stay bolts 48. The intermediate support plate 52 is thicker than the filtration plates 36. It offers a stable and uniform bearing surface for the adjacent filtration plates 36 and, thus, contributes to maintain a uniform clamping pressure across the whole filtration plate assembly. Like the filtration plates 36, each intermediate support plate 52 has a central hole 58 defining a portion of the core passage of the filter section 28. The intermediate support plate 52 typically has the same surface roughness as the filtration plates 36. Accordingly, the filtration gaps on opposed sides of each intermediate support plate 52 are similar to inter-plate gaps 40 between adjacent filtration plates 36.

The above described embodiment of the pressure filtration installation allows improving the compaction of the solid-liquid mixture. That is more liquid can be extracted from the mixture. For red mud dewatering applications, tests have shown that the dehydrated mud may be 70% to 75%, and sometime up to 77% solid in terms of weight at its exit from the outlet section 26 of the screw press 14. For calcium fluoride (CaF2) dewatering applications, tests have shown that the dehydrated mud may be up to 80% solid in terms of weight at its exit from the outlet section 26 of the screw press 14. For iron tailing dewatering applications, tests have shown that the dehydrated mud may be up to 89% solid in terms of weight at its exit from the outlet section 26 of the screw press 14. This is an improvement of about 20% over conventional red mud gravity decanting processes. It can generally be said that the pressure filtration apparatus allows to increase the solid fraction of compacted slurry discharged from the outlet section of a screw press, while maximizing the solid-liquid separation rate.

As can be appreciated from FIG. 2, the tubular body 18 and the screw 20 can be of modular construction. According to the illustrated example, the tubular body 18 has first and second serially interconnectable filter sections 28a; 28b and the screw 20 has corresponding first and second serially interconnectable screw sections 20a, 20b adapted to be respectively mounted in the first and second filter sections 28a, 28b for joint rotation as a unitary component. However, it is understood that the tubular body 18 and the screw 20 could comprise more than two sections.

Figure 6:
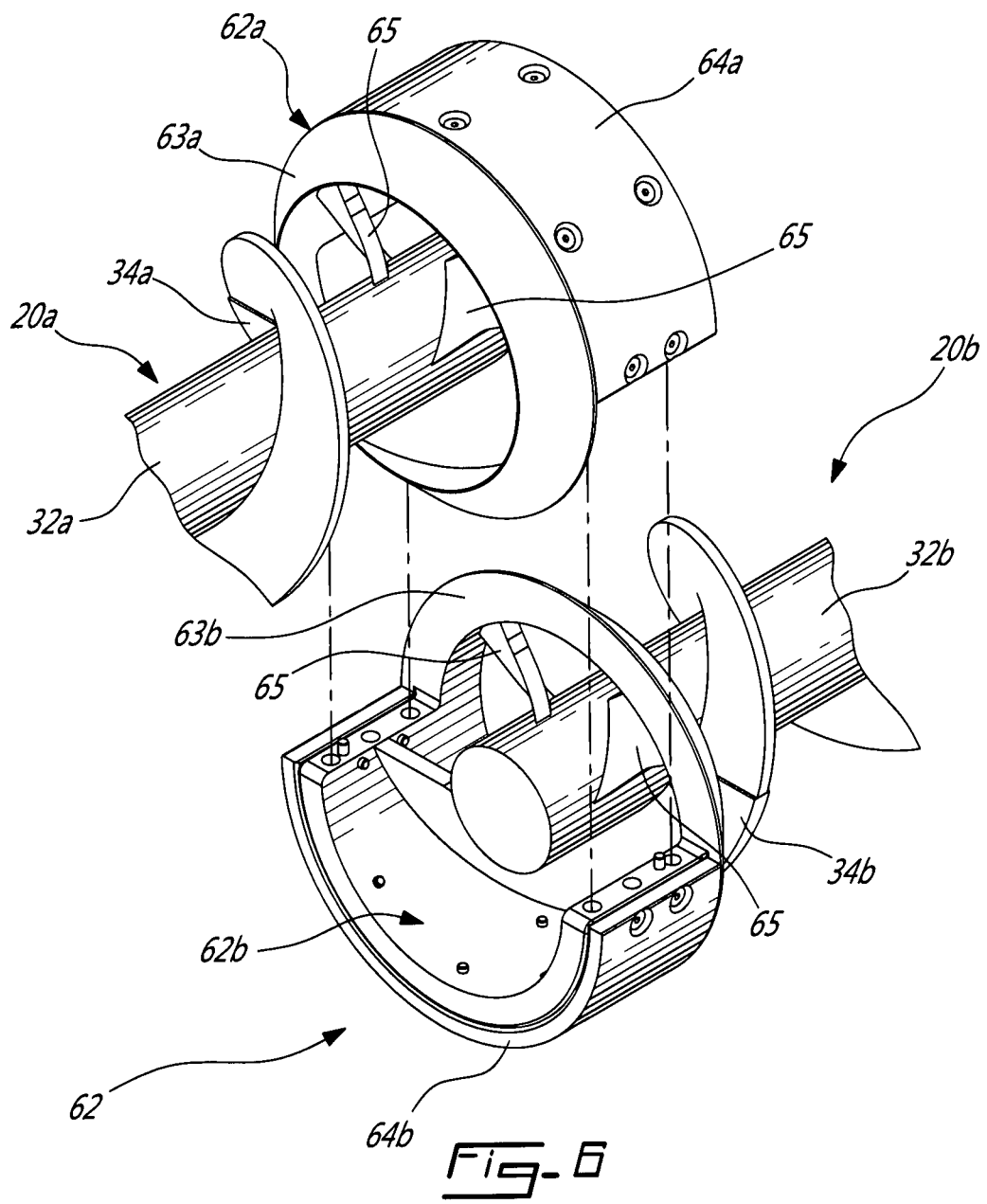
FIG. 6 is a perspective view illustrating the details of an external coupling between two screw sections of the screw press.

The first and second screw sections 20a, 20b are joined together so as to have a continuous screw flight with no discontinuities between the sections 20a, 20b and to ensure that the volume between adjacent turns of the flight 34 at the junction of the two screw sections 20a, 20b is not reduced by the coupling 62. As shown in FIG. 6, the screw sections 20a, 20b are detachably coupled to one another by an external coupling 62 provided at the outside diameter of the flight 34. Typically, screw sections are coupled via their shafts. Such shaft coupling arrangements may in some instances require that the shafts be reinforcement at their junction, thereby resulting in a reduction of the slurry compression volume between adjacent flight turns at the transition from one shaft section to the next. Accordingly, in order not to be intrusive, it is herein proposed to couple the shaft exteriorly from the volume defined between adjacent turns of the flight, thus maintaining the cross sectional area the slurry passes through, which minimises flow restrictions and reduces the likelihood of blockage.

The coupling 62 generally comprises a first coupling member 62a mounted to a first screw flight section 34a at a distal end of the first screw section 20a, and a second coupling member 62b mounted to a second screw flight section 34b at an adjacent end of the second screw section 20b. The first and second coupling members 62a, 62b are detachably fasteneable to one another, such as by bolting.

The first and second coupling members 62a, 62b may comprise semi-cylindrical plates or ring segments mounted to the outside diameter surface of the screw flight sections 34a, 34b, respectively. Each of the screw flight sections 34a, 34b may be provided in the form of a half-flight segment. The inboard end of the semi-cylindrical plates may be integrally provided with a frusto-conical section 63a, 63b adapted to be interconnected to the associated screw shaft sections 32a, 32b via strut-like members 65. When interconnected, the semi-cylindrical plates form a complete support ring about the first and second screw flight sections 34a, 34b, the support ring having an inside diameter corresponding to the outside diameter of the flight 34. Therefore, the coupling 62 does not reduce the volume between flight sections 34a, 34b. The semi-cylindrical plates may be welded on an inner surface thereof to the outside diameter surface of the first and second screw flight sections 34a, 34b. The coupling member 62a, the screw flight section 34a and associated struts 65 are preferably mounted as a pre-assembled unit to screw shaft section 32a. Likewise, the coupling member 62b, the screw flight section 34b and associated struts 65 are preferably mounted as a pre-assembled unit to screw shaft section 32b. According to an embodiment of the present invention, the first and second flight sections 34a, 34b are welded to the inner surface of the coupling members 62a, 62b and then the pre-assembled coupling and flight assemblies are subject to a heat treatment process in order to improve the mechanical properties of the coupling assembly. Thereafter, the heat treated coupling and screw flight united pieces are mounted to respective screw shaft sections 32a, 32b by welding the screw flight sections 34a, 34b to the outer surface of the shaft and to the end of the existing flight on respective shaft sections 32a, and 32b. The screw flight sections 34a, 34b are welded to extend in continuity to the flight already present on the shaft sections 32a, 32b. The struts 65 are also welded to the screw shaft sections 32a, 32b.

By welding screw flight sections 34a, 34b to the coupling members 62a, 62b prior to the heat treatment process and by then connecting the coupling members 62a, 62b to the screw shaft sections 32a, 32b, the structural integrity of the coupling members 62a, 62b can be preserved. Indeed, welding the coupling members 62a, 62b directly to flights on the shaft sections 32a, 32b could potentially negatively affect the mechanical properties of the coupling members 62a, 62b.

Also as shown in FIG. 6, wear plates 64a, 64b are removably mounted to the outer surface of each of the semi-cylindrical coupling members 62a, 62b for engagement with a corresponding segmented wear ring structure (not shown) mounted in a screw support section 66 (see FIG. 2) disposed between the first and second filter sections 28a, 28b. Accordingly, the coupling 62 may also be used to provide an intermediate support to the screw 20 generally mid-way between the opposed ends thereof. The screw support section 66 may comprise upper and lower half-shell members 66a, 66b adapted to be detachably bolted to each other. This ensures ready access to the coupling 62. The segmented wear ring structure (not shown) provided inside the screw support section 66 is configured to wear out prior to the wear plates 64a, 64b on the outer surface of the semi-cylindrical plates of the coupling members 62a, 62b. The upper and lower half-shell members 66a, 66b are provided at opposed end thereof with bolting flanges 68a, 68b for attachment with corresponding bolting flanges 70 provided on the clamping plates 42, 44 of each filter sections 28a, 28b. In this way, each screw and associated filter section 20a, 28a; 20b; 28b can be readily removed as a unit or cartridge and replaced by a similar screw and filtration "cartridge" by simply unbolting flange 70 from flanges 68a, 68b, unbolting the top half-shell member 66a, unbolting the screw coupling members 62a and 62b and unbolting the flange 70 at the other end of the screw and filter section to be replaced. All the bolts, including the bolts used to secure the first and second screw coupling members 62a and 62b, are easily accessible.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. A screw press for separating liquid from a slurry mixture, the screw press comprising:
a tubular body with an axially spaced-apart inlet section and outlet section, and a filter section between said inlet section and outlet section; said filter section including an axially extending stack of coplanar filtration plates defining a core passage; and
a rotatable screw mounted in said tubular body and extending axially through said core passage for conveying the slurry mixture from the inlet section to the outlet section while compressing and dewatering the slurry mixture by forcing at least part of the liquid of the slurry mixture to be expelled out of the tubular body through liquid passages of said filter section surrounding the core passage, said liquid passages being formed by inter-plate gaps defined between each pair of adjacent filtration plates;

wherein the filtration plates are continuously maintained fixed relative to one another and clamped in direct face-to-face contact by a clamping assembly operable for applying a constant axial clamping pressure uniformly about said core passage, and the filtration plates have a predetermined surface roughness, the inter-plate gaps being a function of said predetermined surface roughness and said axial clamping pressure, wherein the surface roughness of the filtration plates corresponds to an average of highest and lowest points on mutually engaging surfaces of the filtration plates, said surface roughness being between 1 to 30 microns, and wherein the clamping assembly further includes first and second clamping plates at opposite ends of the stack of filtration plates and a plurality of bolts connecting the first and second clamping plates, each of the bolts having a nut with a surface directly engaging one of the first and second clamping plates.

2. The screw press defined in claim 1, wherein the inlet section allows maintaining a continuous fluid communication with the tubular body.

3. The screw press defined in claim 1, wherein a pressurized feeder is operatively connected to a source of a slurry mixture to force-feed the tubular body of the screw press at a pressure.

4. The screw press defined in claim 1, wherein the inter-plate gaps are between 2 and 20 microns.

5. The screw press defined in claim 1, wherein the axial clamping pressure applied on each of the filtration plates is between 1.4 N/mm² and 3.5 N/mm².

6. The screw press defined in claim 1, wherein each of the first and second clamping plates has a load distribution portion in uniform bearing contact with an adjacent one of said filtration plates, said first and second clamping plates being thicker than each of said filtration plates.

7. The screw press defined in claim 1, wherein the filtration plates have a filtration height extending radially from an inner diameter of the filtration plates to a peripheral edge thereof, and the filtration plates are in direct face-to-face contact along a full extent of said filtration height.

8. The screw press defined in claim 1, wherein the inter-plate gaps are smaller than a medium-size value of solid particles contained in the slurry mixture to be processed.

9. The screw press defined in claim 1, wherein the filtration plates have a bead blasting surface treatment.

10. The screw press defined in claim 1, wherein the filtration plates are coated with a mixture of paint and particles.

11. A process for separating liquid from a slurry mixture by using a screw press comprising a tubular body with an axially spaced-apart inlet section and outlet section and a filter section, between said inlet section and outlet section, including an axially extending stack of coplanar filtration plates defining a core passage and inter-plate gaps between each pair of adjacent filtration plates, said process comprising:

providing filtration plates having a predetermined surface roughness, wherein the surface roughness of the filtration plates corresponds to an average of highest and lowest points on mutually engaging surfaces of the filtration plates, said surface roughness being between 1 to 30 microns;

applying a constant axial clamping pressure uniformly on the core passage using a clamping assembly for continuously maintaining the filtration plates fixed relative to one another and clamped in direct face-to-face contact by the clamping assembly, the inter-plate gaps being function of said predetermined surface roughness and said axially clamping pressure, wherein the clamping assembly further includes first and second clamping plates at opposite ends of the stack of filtration plates and a plurality of bolts connecting the first and second clamping plates, each of the bolts having a nut with a surface directly engaging one of the first and second clamping plates;

introducing slurry mixture through the inlet section;

conveying the slurry mixture from the inlet section to the outlet section while compressing and dewatering the slurry mixture with a rotatable screw mounted in said tubular body and extending axially through said core passage, by forcing at least part of the liquid of the slurry mixture to be expelled out of the tubular body through liquid passages of said filter section surrounding the core passage, said liquid passages being formed by the inter-plate gaps; and producing a dehydrated mixture at the outlet section.

12. The process defined in claim 11, wherein the slurry mixture is introduced continuously through the inlet section.

13. The process defined in claim 12, wherein the axial clamping pressure applied on each filtration plate is between 1.4 N/mm² (200 psi) and 3.5 N/mm² (500 psi).

14. The process defined in claim 11, wherein the slurry mixture is a residue of Bayer process from production of alumina from Bauxite ore.

15. The screw press defined in claim 3, wherein the pressurized feeder is a positive displacement pump.

16. The screw press defined in claim 3, wherein the pressure ranges from 3.4 N/mm² to 14 N/mm².

17. The screw press defined in claim 3, wherein the pressure ranges from 4 N/mm² to 10 N/mm².

18. The screw press defined in claim 1, wherein said surface roughness is between 2 and 10 microns.

19. The screw press defined in claim 1, wherein said surface roughness is between 1.4 and 3.5 microns.

20. The screw press defined in claim 1, wherein the inter-plate gaps are between 1 and 60 microns.

21. The screw press defined in claim 5, wherein the axial clamping pressure applied on each of the filtration plates is between 2 N/mm² and 2.8 N/mm².

22. The screw press defined in claim 1, wherein the nut directly engages the first clamping plate, and each of the bolts further has a second nut with a second surface directly engaging the second clamping plate.

23. A screw press for separating liquid from a slurry mixture, the screw press comprising:

a tubular body with an axially spaced-apart inlet section and outlet section, and a filter section between said inlet section and outlet section; said filter section including an axially extending stack of coplanar filtration plates defining a core passage; and a rotatable screw mounted in said tubular body and extending axially through said core passage for conveying the slurry mixture from the inlet section to the outlet section while compressing and dewatering the slurry mixture by forcing at least part of the liquid of the slurry mixture to be expelled out of the tubular body through liquid passages of said filter section surrounding the core passage, said liquid passages being formed by inter-plate gaps defined between each pair of adjacent filtration plates;

wherein the filtration plates are continuously maintained fixed relative to one another and clamped in direct face-to-face contact by a clamping assembly operable for applying a constant axial clamping pressure uniformly about said core passage, and the filtration plates have a predetermined surface roughness, the inter-plate gaps being a function of said predetermined surface roughness and said axial clamping pressure, wherein the surface roughness of the filtration plates corresponds to an average of highest and lowest points on mutually engaging surfaces of the filtration plates, said surface roughness being between 1 to 30 microns, and wherein the clamping assembly further includes first and second clamping plates at opposite ends of the stack of filtration plates, with each of the first and second clamping plates having an engaging surface parallel to the filtration plates, and a plurality of bolt assemblies connecting the first and second clamping plates, each of the bolt assemblies comprising a nut and directly engaging the engaging surfaces of the first and second clamping plates to apply the axial clamping pressure to the first and second clamping plates.

* * * * *